(12) United States Patent
Lee

(10) Patent No.: US 7,092,526 B2
(45) Date of Patent: Aug. 15, 2006

(54) METHOD AND SYSTEM FOR PERFORMING SUBWORD PERMUTATION INSTRUCTIONS FOR USE IN TWO-DIMENSIONAL MULTIMEDIA PROCESSING

(75) Inventor: Ruby B. Lee, Princeton, NJ (US)

(73) Assignee: Teleputers, LLC, Princeton, NJ (US)

( * ) Notice: Subject to any disclaimer, the term of this patent is extended or adjusted under 35 U.S.C. 154(b) by 888 days.

(21) Appl. No.: 09/850,380

(22) Filed: May 7, 2001

(65) Prior Publication Data

US 2002/0027552 A1    Mar. 7, 2002

(51) Int. Cl.
*H04K 1/04* (2006.01)
*G06F 7/32* (2006.01)
*G06F 15/00* (2006.01)

(52) U.S. Cl. ............................ 380/37; 708/520; 712/10
(58) Field of Classification Search ................ 708/100, 708/520; 712/1, 10, 20, 16, 24, 200; 380/28, 380/37, 42–47
See application file for complete search history.

(56) References Cited

U.S. PATENT DOCUMENTS 4,751,733 A * 6/1988 Delayaye et al. ............. 380/42

* cited by examiner

*Primary Examiner*—Hosuk Song
(74) *Attorney, Agent, or Firm*—Mathews, Shepherd, McKay & Bruneau, P.A.

(57) ABSTRACT

The method and system provides a set of permutation primitives for current and future 2-D multimedia programs which are based on decomposing images and objects into atomic units, then finding the permutations desired for the atomic units. The subword permutation instructions for these 2-D building blocks are also defined for larger subword sizes at successively higher hierarchical levels. The atomic unit can be a 2×2 matrix and four triangles contained within the 2×2 matrix. Each of the elements in the matrix can represent a subword of one or more bits. The permutations provide vertical, horizontal, diagonal, rotational, and other rearrangements of the elements in the atomic unit.

75 Claims, 7 Drawing Sheets

10

(a) Area mapping of a 4x4 matrix:

(b) Decomposition into four 2x2 matrices:

Rotate by 2 elements = swap diagonal and antidiagonal elements

|              | a | b |
|---|---|---|
| Identity     | A | B |

| | b | A | | B | a |
|---|---|---|---|---|---|
| Changing Rows to Diagonals | B | a | | b | A |

| | B | A | | A | B |
|---|---|---|---|---|---|
| Changing Diagonals to Columns | a | b | | b | a |

Figure 7

Alphabet A:

mixL, mixR on 8, 16 and 32 bit subwords (or cmixL, cmixR)
check on 8, 16 and 32-bit subwords (or ccheck)
excheck on 8, 16 and 32-bit subwords (or cexcheck)
permset on 8, 16 and 32 bit subwords, with 4-element sets (or cexchange)

Fig. 8A

Alphabet B (minimal):

mixL, mixR on 8, 16 and 32 bit subwords (or cmixL, cmixR)
permset on 8, 16 and 32 bit subwords, with 4-element sets (or cexchange)

Fig. 8B

METHOD AND SYSTEM FOR PERFORMING SUBWORD PERMUTATION INSTRUCTIONS FOR USE IN TWO-DIMENSIONAL MULTIMEDIA PROCESSING

BACKGROUND OF THE INVENTION

1. Field of the Invention

The present invention relates to permuting subwords packed in registers in which the subwords can be rearranged within a register and between registers for achieving parallelism in subsequent processing, such as two-dimensional multimedia processing.

2. Description of the Related Art

Efficient processing of multimedia information like images, video and graphics breaks both the sequential processing paradigm and the linear data processing paradigm inherent in the design of computers. Computers have been conventionally designed primarily to process linear sequences of data: memory is addressed as a linear sequence of bytes or words, and data is fetched into the programmable processor and processed sequentially. Efficient processing of pixel-oriented visual material is inherently parallel rather than sequential, and two-dimensional rather than linear (1-D).

Multimedia extensions have been added to general-purpose processors to accelerate the processing of different media types, see Ruby Lee, "Subword Parallelism with MAX-2", IEEE Micro, Vol. 16 No. 4, August 1996, pp. 51–59; IA-64 Application Developer's Architecture Guide, Intel Corporation, Order Number: 245188-001, May 1999. http://developer.intel.com/design/ia64; and AltiVec Extension to PowerPC Instruction Set Architecture Specification. Motorola, Inc., May 1998. http://www.motorola.com/AltiVec. Subword parallelism has been deployed by multimedia instructions in microprocessor architectures and in media processors to accelerate the processing of lower-precision data, like 16-bit audio samples or 8-bit pixel components. SIMD (Single Instruction Multiple Data) parallel processor techniques within a single processor have been referred to as microSIMD architecture, see Ruby Lee, "Efficiency of microSIMD Architectures and Index-Mapped Data for Media Processing", Proceedings of Media Processors 1999, IS&T/SPIE Symposium on Electric Imaging: Science and Technology, January 1999, pp. 34–46. A subword-parallel (or microSIMD) instruction performs the same operation in parallel on multiple pairs of subwords packed into two registers, which are conventionally 32 to 128 bits wide in microprocessors and mediaprocessors. For example, a 64-bit word-oriented datapath can be partitioned into eight 8-bit subwords, or four 16-bit subwords, or two 32-bit subwords.

Conventional shift and rotate instructions have been used to move all the bits in a register by the same amount. Extract and deposit instructions, found in instruction-set architectures like PA-RISC move one field using one or two instructions, as described in Ruby Lee, "Precision Architecture", IEEE Computer, Vol. 22, No. 1, January 1989, pp. 78–91. Early subword permutation instructions like mix and permute in the PA-RISC MAX-2 multimedia instructions are a first attempt to find efficient and general-purpose subword permutation primitives, as described in Ruby Lee, "Subword Parallelism with MAX-2", IEEE Micro, Vol. 16 No. 4, August 1996, pp. 51–59. The subwords in the source register are numbered and a permute instruction specifies the new ordering desired in terms of this numbering. The mux instruction in IA-64 described in IA-64 Application Developer's Architecture Guide, Intel Corporation, Order Number: 245188-001, May 1999. http://developer.intel.com/design/ia64 and the vperm instruction described in Altivec, AltiVec Extension to PowerPC Instruction Set Architecture Specification. Motorola, Inc., May 1998. http://www.motorola.com/AltiVec are similar. There is a limit to the efficiency of the permute instruction for many subwords, since the control bits quickly exceed the number of bits permuted. Permuting four subwords requires only 8 control bits, which can be encoded in the permute instruction itself. Beyond four elements and up to sixteen elements, any arbitrary permutation can still be performed with one instruction, by providing the control bits for the permutation in a second source register, rather than in the 32-bit instruction. Permuting 32 elements requires 160 bits, and permuting 64 elements requires 384 bits (n*log n bits). Hence, permuting more than 16 elements cannot be achieved by a single instruction with two source registers, using this method of specifying permutations. The problem is further complicated by the fact that image, video or graphics processing requires mapping of two-dimensional objects onto subwords in multiple registers and then permuting these subwords between registers.

U.S. Pat. No. 5,673,321 describes a computer instruction (MIXxx) which selects subword items from two source registers in pre-defined ways, for example: MIXWL (Mix Word Left) concatenates the left half (32 bits) of register R1 with the left half of register R2. MIXWR (Mix Word Right) concatenates the right half of R1 with the right half of R2. MIXHL (Mix Half-word Left) concatenates in turn, the first half-words of R1 and R2, followed by the third half-words of R1 and R2. MIXHR (mix Half-word Right) concatenates in turn, the second half-words of R1 and R2, followed by the fourth half-words of R1 and R2, and the like. The instruction also may contain other fields. For example, the MIXxx instructions described above may be used to transpose a 4×4 matrix of half-words contained in four registers R1, R2, R3, R4, each with 4 half-words. MIXBx selects alternate bytes from two source registers, R1 and R2, in two pre-defined ways: MIXBL alternates the 4 odd bytes of R1 with the 4 odd bytes of R2; MIXBR alternates the 4 even bytes of r1 with the 4 even bytes of r2. The MIXBL instruction may be used, for example, to unpack and pack bytes into and out of the more significant half of corresponding half-words. This instruction may be used to "unpack" a register with 8 bytes into 2 registers of 4 half-words each, with each byte being the more significant byte of each half-word. The MIXBL instruction may also be used to unpack and pack bytes into and out of the less significant half of corresponding half-words.

It is desirable to provide efficient subword permutation instructions that can be used for parallel execution for example in 2-D multimedia processing.

SUMMARY OF THE INVENTION

The present invention provides single-cycle instructions, which can be used to construct any type of permutations needed in two-dimensional (2-D) multimedia processing. The instructions can be used in a programmable processor, such as a digital signal processor, video signal processors, media processors, multimedia processors, cryptographic processors and programmable Systemon-a-Chips (SOCs).

The method and system provides a set of permutation primitives for current and future 2-D multimedia programs which are based on decomposing images and objects into atomic units, then finding the permutations desired for the atomic units. The subword permutation instructions for these 2-D building blocks are also defined for larger subword sizes at successively higher hierarchical levels. The atomic unit can be a 2×2 matrix and four triangles contained within the 2×2 matrix. Each of the elements in the matrix can represent a subword of one or more bits. The permutations provide vertical, horizontal, diagonal, rotational, and other rearrangements of the elements in the atomic unit.

The subword permutation primitives of the present invention include: CHECK, EXCHANGE, EXCHECK CCHECK, CEXCHANGE, CEXCHECK, CMIX and PERMSET instructions. The CHECK instruction provides downward and upward swapping of elements. The CCHECK instruction provides conditional downward and upward swapping of elements dependant on permutation control bits. The EXCHANGE instruction provides right and left movement. The CEXCHANGE instruction provides conditional right and left movement. The EXCHECK instruction provides rotation of triangles of the matrix. The CEXCHECK instruction provides conditional rotation of triangles. CMIX provides conditional selection of elements from two source registers in predetermined ways. The Permset instruction allows the permutation of a smaller set of subwords to be repeated on other subwords in the source register, enabling symmetric permutations to be specified on many more elements, without increasing the number of permutation control bits. EXCHANGE instruction is one example of the PERMSET instruction.

An initial alphabet (Alphabet A) of subword permutations is determined which comprises CMIX, PERMSET, CHECK and EXCHECK. Processors designed for high performance can implement Alphabet A, while very cost sensitive processors can choose to implement a smaller set of instructions in a minimal alphabet, such alphabet can include the CMIX and PERMSET instructions. The omitted instructions, CHECK and EXCHECK in Alphabet A, can be composed from CMIX and PERMSET. All the 24 permutations of a 2×2 matrix can be obtained using only instructions from Alphabet A, in a single cycle, in a processor with at least two permutation units.

The subword permutation primitives of the present invention enhance the use of subword parallelism by allowing in-place rearrangement of packed subwords across multiple registers, reducing the need for memory accesses with potentially costly cache misses. The alphabet of permutation primitives is easy to implement and is useful for 2-D multimedia processing and for other data-parallel computations using subword parallelism.

The invention will be more fully described by reference to the following drawings.

BRIEF DESCRIPTION OF THE DRAWINGS

For a better understanding of the present invention, reference may be made to the accompanying drawings.

FIG. 3A is a schematic diagram of an area mapping of a 4×4 matrix.

FIG. 3B is a schematic diagram of decomposition of the 4×4 matrix shown in FIG. 3A into four 2×2 matrices.

FIG. 7 is a schematic diagram of data rearrangements of a 2×2 matrix in which rows are changed into diagonals and diagonals are changed into columns.

FIG. 8A is a diagram of an initial "alphabet A" of subword permutation primitives.

FIG. 8B is a diagram of an alternate alphabet of subword permutation primitives.

DETAILED DESCRIPTION

Figure 1:
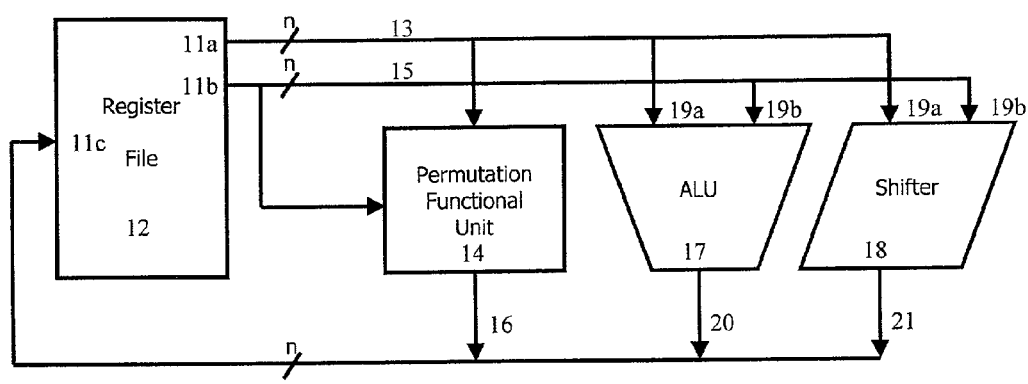
FIG. 1 is a schematic diagram of a system for implementing permutation instructions in accordance with an embodiment of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 illustrates a schematic diagram of a system for implementing efficient permutation instructions 10 in accordance with the teachings of the present invention. Register file 12 includes source register 11a, source register 11b and destination register 11c. System 10 can provide different subword permutations of any one or two registers in register file 12. The same solution can be applied to different subword sizes of $2^i$ bits, for i=0, 1, 2, . . . , m, where n=$2^m$ bits. For a fixed word size of n bits, and 8-bit subwords, there are n/8 subwords to be permuted. For a fixed word size of n bits, and 1-bit subwords, there are n subwords to be permuted. For permutation instructions operating on two source registers, source register values to be permuted 13 from source register 11a and second source register values 15 from source register 11b are applied over datapaths to permutation functional unit 14. Source register values to be permuted 13 and 15 can be a sequence of bits or a sequence of subwords. For permutation instructions operating on one source register, source register values 13 from source register 11a and optionally permutation configuration bits 15 from source register 11b are sent over datapaths to permutation unit 14. Permutation functional unit 14 generates permutation result 16. Permutation result 16 can be an intermediate result if additional permutations are performed by permutation functional unit 14. For other instructions, arithmetic logic unit (ALU) 17 and shifter 18 receive source register values 13 from source register 11a and source register values 15 from source register 11b and generate a respective ALU result 20 and a shifter result 21 over a datapath to destination register 11c. System 10 can be implemented in any programmable processor, for example, a conventional microprocessor, digital signal processor (DSP), cryptographic processor, multimedia processor, mediaprocessor, or programmable System-on-a-Chip (SOC) and can be used in developing processors or coprocessors for providing cryptography and multimedia operations.

Figure 2:
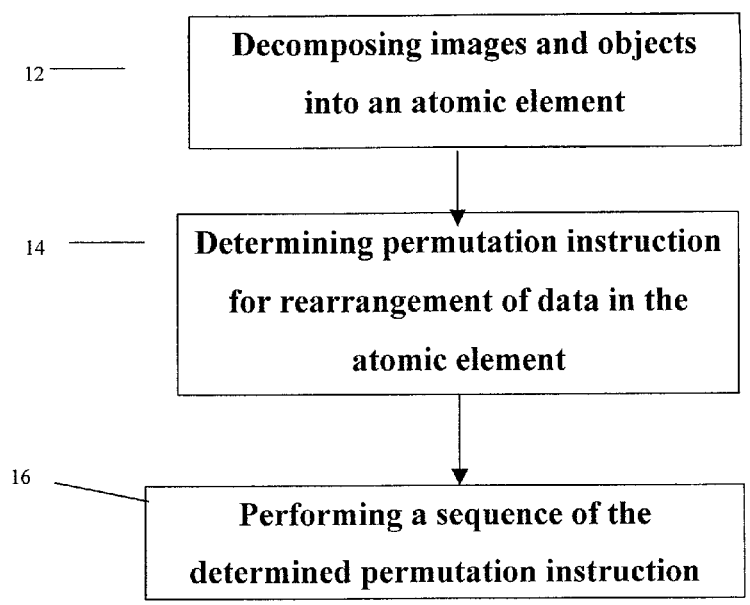
FIG. 2 is a flow diagram of a method for permutation of subwords to be used in parallel processing.

FIG. 2 is a flow diagram of a method for permutation of subwords to be used in parallel processing 10 in accordance with the teachings of the present invention. In block 12, data to be permuted is decomposed into an atomic element. For example, the data to be permuted can comprise pixel oriented data of images, graphics, video or animation which can be represented as two-dimensional (2-D) multi-media data. The data can be stored in memory of a programmable processor such as by using a 2-D array of pixels. The 2-D array of pixels can be for example an 8×8 matrix. For example, in MPEG-1 and MPEG-2 video decode and JPEG image decompression, a frequently computed function is a separable 2-D Inverse Discrete Cosine Transform (IDCT) on an 8×8 matrix. This involves eight 1-D IDCT functions on the columns, followed by eight identical 1-D IDCT functions on the rows.

The 8×8 matrix can be decomposed into four 4×4 matrices, each stored in four 64-bit registers, as shown in FIG. 3a, in which each element is a 16-bit subword. Each such 4×4 matrix can be further decomposed into four 2×2 matrices as shown in FIG. 3b. Matrices with dimensions that are a power of two can be successively decomposed into smaller matrices, and ultimately into the smallest 2×2 matrix. Accordingly, the smallest atomic unit for 2-D multi-media data, such as an image or a frame, is a 2×2 matrix. A 2-D object within a frame can also be decomposed into smaller blocks in which the smallest 2-D rectangular block is a 2×2 matrix of pixels.

A regular decomposable permutation on ($2^m \times 2^n$) elements can be composed from permutations on ($2^{m-1} \times 2^{n-1}$) elements. This decomposability can be repeated until a (2×2) block is reached or a ($2^s \times 2$) block is reached for s>1. This ($2^s \times 2$) block can be further decomposed into (2×2) blocks. A square decomposable permutation on ($2^m \times 2^m$) elements can be decomposed into permutations on ($2^{m-1} \times 2^{m-1}$) elements. This decomposability can be repeated until basic (2×2) blocks are reached.

At the lowest level referred to as the atomic unit, four pixels of a 2×2 matrix can be permuted. At the next higher level, a 2×2 matrix is permuted in which each element is now itself a 2×2 matrix resulting in 4×4 actual elements. Accordingly, the atomic units can serve as permutation primitives for the entire frame. Alternatively, data to be permuted can be represented by non-rectangular objects. Non-rectangular objects can be decomposed into non-rectangular polygons. The smallest non-rectangular polygon is a triangle. A triangle is also an atomic unit.

Figure 4A:
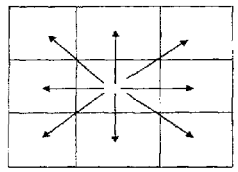
FIG. 4A is a schematic diagram of eight nearest neighbor movements for a pixel in a 2-D frame.
Figure 4B:
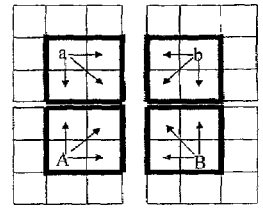
FIG. 4B is a schematic diagram of nearest neighbor movement for four 2×2 matrices.
Figure 4C:
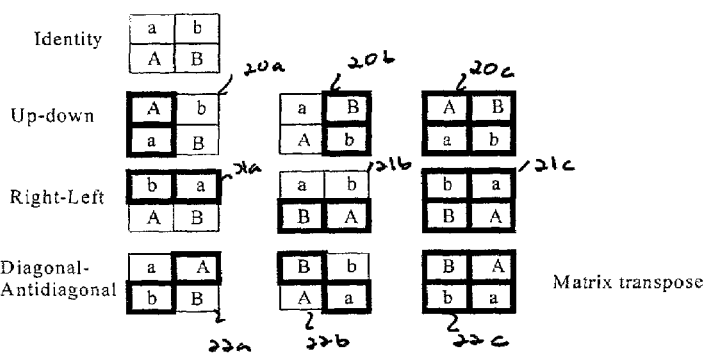
FIG. 4C is a schematic diagram of nearest neighbor movements for a 2×2 matrix.

In block 14 of FIG. 2, permute instructions are determined for rearrangement of data in the 2-D atomic units. A first set of data rearrangements of a 2×2 matrix is to swap elements vertically, horizontally and diagonally. FIG. 4A illustrates eight nearest-neighbor movements for a pixel in a 2-D frame. FIG. 4B illustrates the 9-element matrix of FIG. 4a as four 2×2 matrices which are outlined in bold. As shown in FIG. 4B an element of a 2×2 matrix can move to its right (or left) neighbor, its downward (or upward) neighbor, or its diagonal right (or left) neighbor. FIG. 4C illustrates all possible nearest neighbor movements, for one or two pairs of elements for a 2×2 matrix.

Figure 5A:
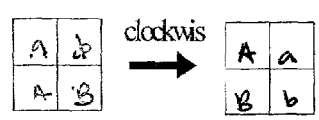
FIG. 5A is a schematic diagram of rotation of a 2×2 matrix.
Figure 5A:
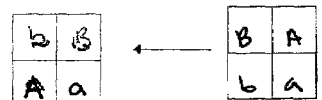

In a second set of data rearrangements, the four elements of a 2×2 matrix can be rotated clockwise by 1, 2 or 3 positions as shown in FIG. 5a. This is equivalent to rotating counter-clockwise by 3, 2 or 1 position. Rotating by 2 positions is equivalent to swapping both the diagonal and anti-diagonal elements, as shown previously in FIG. 4c. Matrices 20a–c illustrate up or down movements of elements. Matrices 21a–21c show right or left movements of elements. Matrices 22a–22c show diagonal or antidiagonal movements of elements. Accordingly, a permutation instruction can be defined only for clockwise or anti-clockwise rotation by 1 position.

Figure 5B:
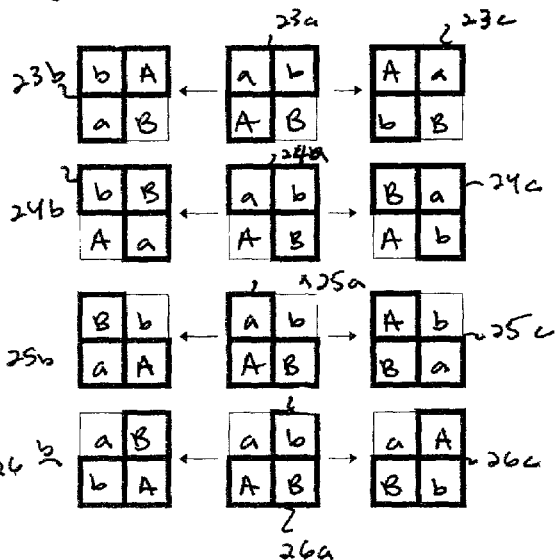
FIG. 5B is a schematic diagram of eight permutations of a 2×2 matrix, representing the rotations of the four triangles contained in the 2×2 matrix.

A 2×2 matrix contains four triangles, each of which can be rotated clockwise or anti-clockwise by 1 position. Rotation of 8 different permutations of the 2×2 matrix is shown in FIG. 5b. Each of matrices 23b, 24b, 25b and 26b is a anti-clockwise rotation of respective triangle 23a, 24a, 25a, and 26a. Each of matrices 23c, 24c, 25c, and 26c is a clockwise rotation of respective triangles 23a, 24a, 25a, and 26a.

In block 16 of FIG. 2, a sequence of the determined permutation instructions are performed for obtaining a desired permutation.

A CHECK instruction can be used as a permutation instruction for downward and upward swapping of elements. The CHECK instruction selects alternately from the corresponding subwords in two source registers for each position in a destination register. The instruction format for the CHECK instruction can be defined as:

CHECK,x R1, R2, R3 wherein x is a parameter that specifies the number of bits for each swap operation, R1 is a reference to a source register which contains a first subword sequence, R2 is a reference to a source register which contains a second subword sequence and R3 is a reference to a destination register where the permuted subwords are placed. For example R1 consists of eight bytes (64 bits); byte a, byte b, byte c, byte d, byte e, byte f, byte g and byte h as shown in Table 1. R2 consists of byte A, byte B, byte C, byte D, byte E, byte F, byte G and byte H. In a CHECK,8 R1, R2, R3 instruction the first 8 bits (byte a) of register R1 are put into destination register R3, the second eight bits of register R2 (byte B) are put into destination register R3 and the like as shown in row 31. For a CHECK,16 R1, R2, R3 instruction the first 16 bits (byte a and byte b) of register R1 are put into register R3, the second 16 bits (byte C and byte D) of register R2 are put into register R3 and the like as shown in row 32. For a CHECK, 32 R1, R2, R3 instruction the first 32 bits (byte a, byte b, byte c and byte d) of register R1 are put into register R3, the second 32 bits (byte E, byte F, byte G and byte H) of register R2 are put into register R3 as shown in row 33. The CHECK instruction can also be defined for 4-bit subwords, 2-bit subwords and 1-bit subwords. In general, it can be defined for subwords of size $2^i$ bits, for i=0, 1, 2, . . . , m, where n=$2^m$ bits and n is the word size, which is usually the width of the registers in bits.

An EXCHANGE instruction can be used as a permutation instruction for right and left movement. The EXCHANGE instruction swaps adjacent subwords in each pair of consecutive subwords in a source register. The instruction format for the EXCHANGE instruction can be defined as:

EXCHANGE, x R1, R3 wherein x is a parameter that specifies the number of bits for each swap operation, R1 is a reference to a source register which contains a subword sequence and R3 is a reference to a destination register where the permuted subwords are placed. In an EXCHANGE,8 R1, R3 instruction the first eight bits of R1(byte a) are exchanged with the second eight bits of R1(byte b) and the like in row 34. In an EXCHANGE, 16 R1,R2 instruction the first sixteen bits of R1(byte a and byte b) are exchanged with the second 16 bits of R1(byte c and byte d) and the like in row 35. In an EXCHANGE,32 R1, R2 instruction the first 32 bits of R1(byte a, byte b, byte c and byte d) are exchanged with the second 32 bits of R1(byte e, byte f, byte g and byte h) in row 36.

The EXCHANGE instruction can also be defined for 4-bit subwords, 2-bit subwords and 1-bit subwords. In general, it can be defined for subwords of size $2^i$ bits, for i=0, 1, 2, . . . , m, where n=$2^m$ bits and n is the word size, which is usually the width of the registers in bits.

An EXCHECK instruction can be used for permutation instructions for rotation of a triangle of three elements within a 2×2 matrix and other permutations. The EXCHECK instruction performs a CHECK instruction on two source registers followed by an EXCHANGE instruction on the result of the CHECK instruction. The instruction format for the EXCHECK instruction can be defined as EXCHECK, x R1,R2,R3 wherein x is a parameter that specifies the number of bits for each swap operation, R1 is a reference to a source register which contains a first subword sequence, R2 is a reference to a source register which contains a second subword sequence and R3 is a reference to a destination register where the permuted subwords are placed. In an EXCHECK,8 R1,R2,R3 instruction a CHECK instruction for R1 and R2 results in destination register R3 shown in row 31. A EXCHANGE instruction of register R3 shown in row 31, exchanges the first eight bits (byte a) with the second eight bits (byteB) and the like in row 37. In an EXCHECK, 16 R1,R2,R3 instruction a CHECK instruction for R1 and R2 results in destination register R3 shown in row 32. A EXCHANGE instruction of register R3 shown in row 32, exchanges the first 16 bits (byte a and byte b) with the second 16 bits(byte C and byte D) and the like in row 38. In an EXCHECK,32 R1,R2,R3 instruction a CHECK instruction for R1 and R2 results in destination register R3 shown in row 33. A EXCHANGE instruction of register R3 shown in row 33, exchanges the first 32 bits (byte a, byte b, byte c and byte d) with the second 16 bits (byte E, byte F, byte G and byte H) in row 39.

The EXCHECK instruction can also be defined for 4-bit subwords, 2-bit subwords and 1-bit subwords. In general, it can be defined for subwords of size $2^i$ bits, for i=0, 1, 2, ..., m, where n=$2^m$ bits and n is the word size, which is usually the width of the registers in bits.

TABLE 1

|  | Instruction: | Register Contents:<br>R1 = a b c d e f g h<br>R2 = A B C D E F G H<br>Definition: |
|---|---|---|
| row 31 | check, 8 R1,R2,R3 | R3 = a B c D e F g H |
| row 32 | check, 16 R1,R2,R3 | R3 = a b C D e f G H |
| row 33 | check, 32 R1,R2,R3 | R3 = a b c d E F G H |
| row 34 | exchange, 8 R1,R3 | R3 = b a d c f e h g |
| row 35 | exchange, 16 R1,R3 | R3 = c d a b g h e f |
| row 36 | exchange, 32 R1,R3 | R3 = e f g h a b c d |
| row 37 | excheck, 8 R1,R2,R3 | R3 = B a D c F e H g |
| row 38 | excheck, 16 R1,R2,R3 | R3 = C D a b G H e f |
| row 39 | excheck, 32 R1,R2,R3 | R3 = E F G H a b c d |

A MIX operation, defined in U.S. Pat. No. 5,673,321 hereby incorporated by reference into this application can be used for swapping of diagonal elements. The MIX operation selects either all even elements, or all odd elements, from the two source registers. A MIXL instruction can be used to interleave the corresponding "even" elements from the two source registers, starting from the leftmost elements in each register. A MIXR instruction can be used to interleave the corresponding "odd" elements from the two source registers, ending with the rightmost elements in each register.

Table 2 defines MIXL and MIXR instructions, for three different subword sizes: 8 bits, 16 bits and 32 bits. Each letter in the register contents R1 and R2 represents an 8-bit subword, and each register holds a total of 64 bits.

TABLE 2

| Instruction: | Register Contents:<br>R1 = a b c d e f g h<br>R2 = A B C D E F G H<br>Definition: |
|---|---|
| MixL, 8 R1,R2,R3 | R3 = a A c C e E g G |
| MixR, 8 R1,R2,R3 | R3 = b B d D f F h H |
| MixL, 16 R1,R2,R3 | R3 = a b A B e f E F |
| MixR, 16 R1,R2,R3 | R3 = c d C D g h G H |
| MixL, 32 R1,R2,R3 | R3 = a b c d A B C D |
| MixR, 32 R1,R2,R3 | R3 = e f g h E F G H |

Figure 6:
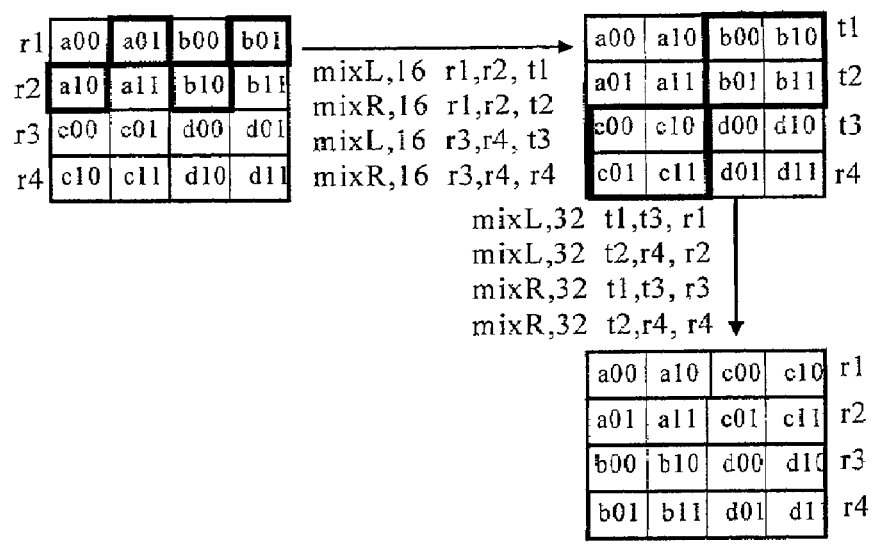
FIG. 6 is a schematic diagram of a matrix transpose of a 4×4 matrix.

A decomposable permutation is a 2-D object matrix transpose in which the matrix is flipped along its diagonal: rows become columns, and columns become rows. For example, an 8×8 matrix of 16-bit elements stored in 16 registers can be decomposed into four 4×4 matrices (FIG. 3a), each of which can be further decomposed into four 2×2 matrices (FIG. 3b). By transposing each of the 2×2 matrices, then transposing the larger 2×2 matrix, where each element is itself one of these 2×2 matrices, a matrix transpose of a 4×4 matrix can be obtained as shown in FIG. 6. The MIX instructions can be used to perform the hierarchical 2×2 matrix transpositions. The MIXL and MIXR instructions are used in pairs at the level of a subword size equal to the matrix element size. Thereafter, the MIXL and MIXR instructions are used at the size of subwords that are twice as large. Repeating this on each of the four 4×4 matrices determines the transpose of the original 8×8 matrix.

Table 3 illustrates a systematical enumeration of the permutations of area-mapped 2×2 matrices for illustrating that the subword permutation instructions defined above can perform the described permutations. R1 and R2 contain four 2×2 matrices. The leftmost matrix has been highlighted in bold for indicating the permutation of the first 2×2 matrix that is labeled initially "a b" in R1 and "A B" in R2. The permutations are enumerated as follows: each of the 4 elements in a resulting 2×2 matrix can be in the top left corner in R3. Thereafter, each of the 3 remaining elements can be in the top right corner in R3. This gives 12 possibilities for the top row, which is used for the numeric numbering of the cases. The two remaining elements of each 2×2 matrix are in the bottom row in R4, and their two possible orderings give the (a) and (b) numbering in Table 3.

TABLE 3

All Permutations of Four Area-Mapped 2 × 2 Matrices

Operand registers:
R1 = a b c d e f g h
R2 = A B C D E F G H

| Result Registers: | | Instructions Used: | Type of Data Movement: |
|---|---|---|---|
| 1(a) | R3 = a b c d e f g h | ;R3=R1 | identity permutation |
| a at top left | R4 = A B C D E F G H | ;R4=R2 | |
| 1(b) | R3 = a b c d e f g h | ;R3=R1 | swap bottom row elements right-left |
| | R4 = B A D C F E H G | ;R4=exchange(R2) | |

TABLE 3-continued

All Permutations of Four Area-Mapped 2 × 2 Matrices

Operand registers:
R1 = a b c d e f g h
R2 = A B C D E F G H

| | Result Registers: | Instructions Used: | Type of Data Movement: |
|---|---|---|---|
| 2(a) | R3 = a B c D e F g H | ;R3=check(R1,R2) | swap right column elements up- |
| | R4 = A b C d E f G h | ;R4=check(R2,R1) | down |
| 2(b) | R3 = a B c D e F g H | ;R3=check(R1,R2) | rotate bottom-right triangle anti- |
| | R4 = b A d C f E h G | ;R4=excheck(R2,R1) | clockwise |
| 3(a) | R3 = a A c C e E g G | ;R3=mixL(R1,R2) | swap diagonal elements = |
| | R4 = b B d D f F h H | ;R4=mixR(R1,R2) | transpose |
| 3(b) | R3 = a A c C e E g G | ;R3=mixL(R1,R2) | rotate bottom-right triangle |
| | R4 = B b D d F f H h | ;R4=mixR(R2,R1) | clockwise |
| 4(a) | R3 = b a d c f e h g | ;R3=exchange(R1) | swap top row elements right-left |
| b at top left | R4 = A B C D E F G H | ;R4=R2 | |
| 4(b) | R3 = b a d c f e h g | ;R3=exchange(R1) | swap both rows' elements right- |
| | R4 = B A D C F E H G | ;R4=exchange(R2) | left |
| 5(a) | R3 = b B d D f F h H | ;R3=mixR(R1,R2) | rotate top-right triangle anti- |
| | R4 = A a C c E e G g | ;R4=mixL(R2,R1) | clockwise |
| 5(b) | R3 = b B d D f F h H | ;R3=mixR(R1,R2) | rotate anti-clockwise 1 element |
| | R4 = a A c C e E g G | ;R4=mixL(R1,R2) | |
| 6(a) | R3 = b A d C f E h G | ;R3=excheck(R2,R1) | rotate top-left triangle anti- |
| | R4 = a B c D e F g H | ;R4=check(R1,R2) | clockwise |
| 6(b) | R3 = b A d C f H h H | ;R3=excheck(R2,R1) | 40 a |
| | R4 = B a D c F e H g | ;R4=excheck(R1,R2) | |
| 7(a) | R3 = A a C c E e G g | ;R3=mixL(R2,R1) | rotate top-left triangle clockwise |
| A at top left | R4 = b B d D f F h H | ;R4=mixR(R1,R2) | |
| 7(b) | R3 = A a C c E e G g | ;R3=mixL(R2,R1) | rotate clockwise 1 element |
| | R4 = B b D d F f H h | ;R4=mixR(R2,R1) | |
| 8(a) | R3 = A b C d E f G h | ;R3=check(R2,R1) | swap left column elements up- |
| | R4 = a B c D e F g H | ;R4=check(R1,R2) | down |
| 8(b) | R3 = A b C d E f G h | ;R3=check(R2,R1) | rotate bottom-left triangle |
| | R4 = B a D c F e H g | ;R4=excheck(R1,R2) | clockwise |
| 9(a) | R3 = A B C D E F G H | ;R3=R2 | swap left and right column |
| | R4 = a b c d e f g h | ;R4=R1 | elements up-down |
| 9(b) | R3 = A B C D E F G H | ;R3=R2 | 40 b |
| | R4 = b a d c f e h g | ;R4=exchange(R1) | |
| 10(a) | R3 = B a D c F e H g | ;R3=excheck(R1,R2) | rotate top-right triangle clockwise |
| B at top left | R4 = A b C d E f G h | ;R4=check(R2,R1) | |
| 10(b) | R3 = B a D c F e H g | ;R3=excheck(R1,R2) | 40 c |
| | R4 = b A d C f E h G | ;R4=excheck(R2,R1) | |
| 11(a) | R3 = B b D d F f H h | ;R3=mixR(R2,R1) | rotate bottom-left triangle anti- |
| | R4 = a A c C e E g G | ;R4=mixL(R1,R2) | clockwise |
| 11(b) | R3 = B b D d F f H h | ;R3=mixR(R2,R1) | swap anti-diagonal elements |
| | R4 = A a C c E e G g | ;R4=mixL(R2,R1) | |
| 12(a) | R3 = B A D C F E H G | ;R3=exchange(R2) | 40 d |
| | R4 = a b c d e f g h | ;R4=R1 | |
| 12(b) | R3 = B A D C F E H G | ;R3=exchange(R2) | swap diagonal and anti-diagonal |
| | R4 = b a d c f e h g | ;R4=exchange(R1) | elements = rotate clockwise by 2 |

The subword permutation instructions used to achieve each of the 2×2 block permutations are shown. If the processor has at least two permutation units, then each case in Table 3 can be executed in one cycle, since there are no dependencies in generating R3 and R4 providing for efficiency of these permutation primitives.

Each 2×2 matrix permutation is also labeled with one of the 20 data movements including identity, described in FIGS. 4c, 5a and 5b. There are four permutations in Table 3 that are not labeled with a data movement 40a–40d. These permutations correspond to data rearrangements of a 2×2 matrix, described as changing rows into diagonals, and changing diagonals into columns, as shown in FIG. 7.

In an alternate embodiment, permutation instructions provide conditional swaps between the targeted subwords in two registers and between subwords in one register.

The instructions can be used for all different subword sizes of $2^i$ bits, for i=0, 1, 2, ... n/2. A CCHECK instruction can be used as a permutation instruction for conditional downward and upward swapping of elements. The CCHECK instruction selects conditionally from the corresponding subwords in two source registers for each position in a destination register dependant on a control bit. The instruction format for the CCHECK instruction can be defined as:

CCHECK,0xxxxxxx R1, R2, R3 wherein control bits are denoted as "xxxxxxx", R1 is a reference to a source register which contains a first subword sequence, R2 is a reference to a source register which contains a second subword sequence and R3 is a reference to a destination register where the permuted subwords are placed. If the control bit is a 1, the CCHECK instruction swaps the corresponding elements in register R1 and register R2. If the control bit is a 0, the CCHECK does not swap corresponding elements in register R1 and register R2. A control bit can be used for each potential swap between a pair of subwords. For "CHECK,8", 4 control bits are used in the CCHECK instruction to specify if the right 1-byte subword of each pair of subwords in R1 should be swapped with the corresponding subword in R2. For "CHECK, 16", 2 control bits are used in the CCHECK instruction to specify if the right 2-byte subword of each pair of subwords in R1 should be swapped with the corresponding subword in R2. For "CHECK,32", 1 control bit is used in the CCHECK instruction to specify if the right 4-byte subword of R1 should be swapped with that in R2. Table 4A illustrates a comparison between a CCHECK instruction and a CHECK instruction for different subword sizes.

A CEXCHANGE instruction can be used as a permutation instruction for conditional right and left movement. The CEXCHANGE instruction conditionally swaps adjacent subwords in each pair of consecutive subwords in a source register dependant on a control bit. The instruction format for the CEXCHANGE instruction can be defined as CEXCHANGE, 0xxxxxxx R1, R3 wherein control bits are denoted as "xxxxxxx", R1 is a reference to a source register which contains a subword sequence and R3 is a reference to a destination register where the permuted subwords are placed.

The CEXCHANGE can be used to represent a binary tree in which at each level of the tree, the left subtree can be swapped with the right subtree. A subtree at level i is represented by a subword of size $n/2^i$, where the root of the binary tree is at level 0, and the leaves of the tree are at level $1g(n)$. That is, the root node of the binary tree has 2 subtrees at level 1. The root node is represented by the whole word of size n bits. Level 1 of the tree is represented by 2 subwords, each of size n/2 bits. Level 2 of the binary tree is represented by 4 subwords, each of size n/4 bits. Level 3 of the binary tree is represented by 8 subwords, each of size n/8 bits and the like. The last (leaf) level of the tree is level $1g(n)$. It has n subwords, each of size $n/2^{1g(n)}$ bits, i.e., n subwords, each of size 1 bit.

A CEXCHECK instruction can be used for permutation instructions for conditional rotation of a triangle of three elements within a 2×2 matrix. The CEXCHECK instruction performs a conditional CHECK instruction on two source registers followed by EXCHANGE instruction on the result of the CHECK instruction. The instruction format for the CEXCHECK instruction can be defined as CEXCHECK, 0xxxxxxx R1,R2,R3 wherein control bits are denoted as "xxxxxxx", R1 is a reference to a source register which contains a first subword sequence, R2 is a reference to a source register which contains a second subword sequence and R3 is a reference to a destination register where the permuted subwords are placed.

In an alternate embodiment, a CMIXxx operation conditionally selects either even elements, or odd elements, from two source registers. The instruction format for a CMIXL permutation instruction can be defined as CMIXL, 0xxxxxxx, R1,R2,R3 and the instruction format for a CMIXR permutation instruction can be defined as CMIXR, 0xxxxxxx, R1,R2,R3 wherein control bits are denoted as "xxxxxxx", R1 is a reference to a source register which contains a first subword sequence, R2 is a reference to a source register which contains a second subword sequence and R3 is a reference to a destination register where the permuted subwords are placed.

The conditional instructions allow 3 subword variants of each instruction to be replaced by a single "conditional combined" instruction with 8 control bits. The conditional instructions can be used to combine 3 instructions into one and allow individual swaps to be enabled or disabled. For example, Table 4A shows how the CCHECK instruction can replace the "CHECK,8", "CHECK,16" and "CHECK,32" instructions; the CEXCHANGE instruction can replace the "EXCHANGE,8", "EXCHANGE,16" and "EXCHANGE, 32" instructions; the CEXCHECK instruction can replace the "EXCHECK,8", "EXCHECK,16" and "EXCHECK,32" instructions; the CMIXL instruction can replace the "MIXL, 8", "MIXL,16" and "MIXL,32" instructions; and the CMIXR instruction can replace the "MIXR,8", "MIXR,16" and "MIXR,32" instructions.

TABLE 4A

| Instruction: | Equivalent conditional combined Instruction: |
|---|---|
| Check, 8 R1,R2,R3 | Ccheck, 00001111 R1,R2,R3 |
| Check, 16 R1,R2,R3 | Ccheck, 00110000 R1,R2,R3 |
| Check, 32 R1,R2,R3 | Ccheck, 01000000 R1,R2,R3 |
| Exchange, 8 R1,R3 | Cexchange, 00001111 R1,R2,R3 |
| Exchange, 16 R1,R3 | Cexchange, 00110000 R1,R2,R3 |
| Exchange, 32 R1,R3 | Cexchange, 01000000 R1,R2,R3 |
| Excheck, 8 R1,R2,R3 | Cexcheck, 00001111 R1,R2,R3 |
| Excheck, 16 R1,R2,R3 | Cexcheck, 00110000 R1,R2,R3 |
| Excheck, 32 R1,R2,R3 | Cexcheck, 01000000 R1,R2,R3 |
| MixL, 8 R1,R2,R3 | CmixL, 00001111 R1,R2,R3 |
| MixL, 16 R1,R2,R3 | CmixL, 00110000 R1,R2,R3 |
| MixL, 32 R1,R2,R3 | CmixL, 01000000 R1,R2,R3 |
| MixR, 8 R1,R2,R3 | CmixR, 00001111 R1,R2,R3 |
| MixR, 16 R1,R2,R3 | CmixR, 00110000 R1,R2,R3 |
| MixR, 32 R1,R2,R3 | CmixR, 01000000 R1,R2,R3 |

Table 4B provides examples of the conditional swapping of subwords that can be achieved with the CEXCHANGE, CCHECK, CEXCHECK, CMIXL and CMIXR instructions. The control bits are applied from left to right. This means that the conditional swapping of targeted subwords is first applied to the contents of the registers interpreted as 32-bit subwords, secondly conditional swapping of targeted subwords is applied to the contents of the registers interpreted as 16-bit subwords, and lastly conditional swapping of targeted subwords is applied to the contents of the registers interpreted as 8-bit subwords.

For example, row 51 of Table 4B shows the conditional replacement of even bytes in R1 with the corresponding byte in R2. The zeros in the $0^{th}$, $1^{st}$, $2^{nd}$, and $3^{rd}$ control bits indicate that there is no swapping of subwords at the 32-bit subword or 16-bit subword levels. The "1" in the $4^{th}$ control bit indicates that the CHECK swapping of the second bytes, "b" in register R1 and "B" in register R2, is performed. The "0" in the $5^{th}$ control bit indicates that the CHECK swapping of the fourth bytes in registers R1 and R2 is not performed. The "0" in the $6^{th}$ control bit indicates that the CHECK swapping of the sixth bytes in registers R1 and R2 is not performed. The "1" in the $7^{th}$ control bit indicates that the swapping of the eigth bytes, "h" in register R1 and "H" in R2, is performed.

The $0^{th}$ control bit is always "0" in the definition of CCHECK, CEXCHANGE and CEXCHECK in this embodiment. Eight control bits are used rather than seven to provide a definition of a byte of control bits. The extra control bit allows flexibility in redefining the seven remaining control bits in an alternate embodiment, or for defining an extra function to be performed. It will be appreciated by one of ordinary skill in the art that if this $0^{th}$ control bit is "1", another function can be performed in addition to the conditional permutations defined by the other 7 control bits. For example, this function could be used to perform an exclusive-or operation on registers R1 and R2 before performing the conditional swaps defined by the seven remaining control bits. In an alternative embodiment, if the $0^{th}$ control bit is "1", a left shift by one byte can be performed after performing the conditional swaps defined by the seven remaining control bits.

In row 52, the zeros in the $0^{th}$ and $1^{st}$ control bits indicate that there is no swapping of subwords at the 32-bit subword level. The "1" in the $2^{nd}$ control bit indicates that the CHECK swapping of the second 16-bit subwords, "cd" in register R1 and "CD" in register R2, is performed. The "0" in the $3^{rd}$ control bit indicates that the CHECK swapping of the fourth 16-bit subwords in registers R1 and R2 is not performed. The "1" in the $4^{th}$ control bit indicates that the CHECK swapping of the second bytes, "b" in register R1 and "B" in register R2, is performed. The "0" in the $5^{th}$ control bit indicates that the CHECK swapping of the fourth bytes in registers R1 and R2 is not performed. The "1" in the $6^{th}$ control bit indicates that the CHECK swapping of the sixth bytes, "f" in register R1 and "F" in register R2 is performed. The "0" in the $7^{th}$ control bit indicates that the swapping of the eigth bytes in registers R1 and R2 is not performed.

Row 54 of Table 4B is an example of CEXCHANGE, the conditional swapping of left and right adjacent subwords of different sizes. All the $1^{st}$ through $7^{th}$ control bits are 1 in this example. The "1" in the $1^{st}$ control bit indicates that the conditional EXCHANGE swapping of left subword "abcd" and right subword "efgh" of register R1 at the 32-bit subword level is performed. This gives an intermediate result of "efghabcd". The "11" in the $2^{nd}$ and $3^{rd}$ control bits indicate that the EXCHANGE swapping of the left and right 16-bit subwords, for each pair of 16-bit subwords in this intermediate result is performed. This swaps "ef" with "gh", and "ab" with "cd", giving an intermediate result of "ghefcdab". The "1111" in the $4^{th}$, $5^{th}$, $6^{th}$, and $7^{th}$ control bits indicate that the conditional EXCHANGE swapping of the left and right bytes in each pair of bytes in the intermediate result is performed. This gives a final result of "hgfedcba", which is placed in the destination register R3.

This performs a complete reversal of the bytes in the source register R1, with one CEXCHANGE instruction. It has been found that while EXCHANGE can easily be done in one processor cycle, CEXCHANGE is likely to take a longer cycle, or more than one cycle to complete.

Row 60 gives an example of CEXCHECK where the conditional EXCHECK permutation is performed at the 32-bit subword level, not performed at the 16-bit subword level, and performed on some of the bytes at the 8-bit subword level. The "1" in the $1^{st}$ control bit indicates that the conditional EXCHECK swapping of second 32-bit subwords "efgh" in R1 and "EFGH" in register R2, followed by the exchange of "abcd" and "EFGH" is performed. This gives an intermediate result of "EFGHabcd". The "00" in the $2^{nd}$ and $3^{rd}$ control bits indicate that the conditional EXCHECK operation at the 16-bit subword level is not performed. The "1" in the $4^{th}$ control bit indicates the conditional EXCHECK operation is performed on the first two bytes "EF" of the intermediate result and the second byte "B" of R2. This gives an intermediate result of "BEGHabcd". The "00" in the $5^{th}$ and $6^{th}$ control bits indicate that the next 2 pairs of bytes in the intermediate result are unchanged. The "1" in the $7^{th}$ control bit indicates that the conditional EXCHECK operation on the last pair of bytes "cd" in the intermediate result and the eigth (last) byte "H" in R2 is performed. This gives a final result of "BEGHabHc", which is placed in the destination register R3.

Row 61 gives an example of CMIXL where the conditional MIXL permutation is performed at all three subword levels. All the $1^{st}$ through $7^{th}$ control bits are 1 in this example. The "1" in the $1^{st}$ control bit indicates that the conditional MIXL interleaving of even subword "abcd" of register R1 and even subword "ABCD" of register R2 at the 32-bit subword level is performed. This gives an intermediate result of "abcdABCD". The "11" in the $2^{nd}$ and $3^{rd}$ control bits indicate that the conditional MIXL interleaving of the even 16-bit subwords of the intermediate result and the even 16-bit subwords of register R2 is performed. This gives an intermediate result of "abABABEF". The "1111" in the $4^{th}$, $5^{th}$, $6^{th}$, and $7^{th}$ control bits indicate that the conditional MIXL interleaving of the even 8-bit subwords of the intermediate result and the even 8-bit subwords of register R2 is performed. This gives a final result of "aAACAEEG", which is placed in the destination register R3.

Row 62 gives an example of CMIXR where the conditional MIXR permutation is performed at the 32-bit subword level, not performed at the 16-bit subword level, and performed on some of the bytes at the 8-bit subword level. The "1" in the $1^{st}$ control bit indicates that the conditional MIXR interleaving of odd subword "efgh" of register R1 and odd subword "EFGH" of register R2 at the 32-bit subword level is performed. This gives an intermediate result of "efghEFGH". The "00" in the $2^{nd}$ and $3^{rd}$ control bits indicate that the conditional MIXR operation at the 16-bit subword level is not performed. The "1" in the $4^{th}$ control bit indicates the conditional MIXR operation is performed on the first two bytes "ef" of the intermediate result and the byte "B" of R2. This is equivalent to interleaving the $1^{st}$ odd bytes "f" in the intermediate result and "B" in register R2, and gives a new intermediate result of "fBghEFGH". The "00" in the $5^{th}$ and $6^{th}$ control bits indicate that the next 2 pairs of bytes in the intermediate result are unchanged. The "1" in the $7^{th}$ control bit indicates that the conditional MIXR operation on the last pair of bytes "GH" in the intermediate result and the eigth (last) byte "H" in R2 is performed. This gives a final result of "fBghEFHH", which is placed in the destination register R3.

TABLE 4B

| Instruction: | Register Contents:<br>R1 = a b c d e f g h<br>R2 = A B C D E F G H<br>Definition: |
|---|---|
| row 51   Ccheck, 00001001 R1,R2,R3 | R3 = a B c d e f g H |
| row 52   Ccheck, 00101010 R1,R2,R3 | R3 = a B C D e F g h |
| row 53   Ccheck, 01001001 R1,R2,R3 | R3 = a B c d E F G H |
| row 54   Cexchange, 01111111 R1,R2,R3 | R3 = h g f e d c b a |
| row 55   Cexchange, 00001010 R1,R2,R3 | R3 = b a c d f e g h |
| row 56   Cexchange, 00110001 R1,R2,R3 | R3 = c d a b g h f e |
| row 57   Cexchange, 01001101 R1,R2,R3 | R3 = f e h g a b d c |
| row 58   Cexcheck, 00001011 R1,R2,R3 | R3 = B a c d F e H g |
| row 59   Cexcheck, 00101011 R1,R2,R3 | R3 = B C a b F e H g |
| row 60   Cexcheck, 01001001 R1,R2,R3 | R3 = B E G H a b H c |
| row 61   CmixL, 01111111 R1,R2,R3 | R3 = a A A C A E E G |
| row 62   CmixR, 01001001 R1,R2,R3 | R3 = f B g h E F H H |

In an alternate embodiment, a PERMSET permutation instruction is provided which repeats a permutation on a subset of elements over the rest of the elements in the register. The instruction format for the PERMSET instruction can be defined as PERMSET, s,e,c R1,Rt wherein s is a parameter representing the subword size, e is a parameter representing the number of elements to be permuted in each set, c represents permutation control bits, R1 is a reference to a source register which contains a first subword sequence and Rt is a reference to a destination register where the permuted subwords are placed. The permutation control bits number the e subwords in each set of subwords to be permuted in the source register. A comparison between the conventional PERMUTE instruction as described in Ruby Lee, "Subword Parallelism with MAX-2", IEEE Micro, Vol. 16 No. 4, August 1996, pp. 42–50 hereby incorporated by reference into this application and the PERMSET instruction is shown in Table 5. Using the PERMSET instruction, the first four permutations can be specified as permutations on sets of 4 elements. The identity and EXCHANGE instruction described above can be replaced by exactly one such PERMSET instruction. The broadcast and reverse operations each need two PERMSET instructions, with 4-element permute sets.

TABLE 5

| Permute example | Equivalent Permset instructions | Type of permutation |
| --- | --- | --- |
| permute,1,01234567 R1, Rt | permset,1,4,0123 R1, Rt | identity |
| permute,1,10325476 R1, Rt | permset,1,4,1032 R1, Rt | exchange |
| permute,1,66666666 R1, Rt | permset,1,4,2222 R1, Rt permset,2,4,2222 Rt, Rt | broadcast |
| permute,1,76543210 R1, Rt | permset,1,4,3210 R1, Rt permset,2,4,2301 Rt, Rt | reverse |

An alphabet of fundamental permutation primitives can be defined to express efficiently all data rearrangement needs of 2-D multimedia processing programs. The alphabet can represent a selection of the above described subword permutation instructions. An initial "alphabet A" of subword permutation instructions is shown in FIG. 8A, including mixL, mixR, CHECK, EXCHECK and PERMSET instructions, defined on 8, 16 and 32 bit subwords. For alternative implementations, such as low cost implementations at slightly reduced performance, a "minimal alphabet" could exclude CHECK and EXCHECK instructions as shown in FIG. 8B. The CHECK instruction can be excluded from a minimal set, because a Shift_Left of the second operand, followed by a mixL instruction can accomplish it. The EXCHECK instruction is the composition of the CHECK instruction followed by the EXCHANGE instruction and can be omitted from a minimal set of fundamental permutations. They are included in alphabet A for efficiency and uniformity in performance, so that every permutation of a basic 2×2 matrix, as enumerated in Table 3 can be done in a single cycle. This is achieved either with two permutation units and two instructions (e.g., mixL and mixR), or with one permutation unit and one instruction that has two result register writes (e.g., mixLR).

The minimal alphabet of a mixL, mixR and PERMSET instruction can be further reduced depending on the size of the registers in the processor, by not supporting all the subword sizes indicated. For example, if registers are only 64 bits wide, then permutation instructions for two 32-bit subwords may not be needed, since they can be specified as permutations on the four 16-bit subwords. For fast cryptography, these permutation instructions can also be extended down to subwords of 4 bits, 2 bits and 1 bit.

Alternatively, an alphabet can be formed of the combined conditional permutation instructions, CMIXL, CMIXR, CCHECK, CEXCHECK and CEXCHANGE to combine all the instruction variants for different subword sizes into one instruction, with the additional power to enable or disable individual subword permutations. A minimal alphabet could also be formed from CMIXL, CMIXR and CEXCHANGE.

It is understood that the above-described embodiments are illustrative of only a few of the many possible specific embodiments which can represent applications of the principles of the invention. Numerous and varied other arrangements can be readily derived in accordance with these principles by those skilled in the art without departing from the spirit and scope of the invention.

What is claimed is:

1. A method for permuting two dimensional (2-D) data in a programmable processor comprising the steps of:
decomposing said two dimensional data into at least one atomic element said two dimensional data being located in at least one source register said at least one atomic element of said two dimensional data is a 2×2 matrix and said two dimensional data is decomposed into data elements in said matrix;
determining at least one permutation instruction for rearrangement of said data in said atomic element;
said data elements being rearranged by said at least one permutation instruction, each of said data elements representing a subword having one or more bits; and
applying said permutation instructions to said subwords and placing said permutated subwords into a destination register.

2. The method of claim 1 further comprising a triangle in said matrix, said data elements in said triangle being rearranged by said at least one permutation instruction.

3. The method of claim 2 wherein said permutation instruction rotates a first one of said data elements by one or more positions in said triangle.

4. The method of claim 1 wherein said permutation instruction swaps a first one of said data elements and a second one of said data elements, said first one of said data elements and said second one of said data elements being in the same column of said matrix.

5. The method of claim 1 wherein said permutation instruction swaps a first one of said data elements and a second one of said data elements, said first one of said data elements and said second one of said data elements being in the same row of said matrix.

6. The method of claim 1 wherein said permutation instruction swaps a first one of said data elements and a second one of said data elements, said first one of said data elements and said second one of said data elements being diagonal to one another in said matrix.

7. The method of claim 1 wherein said permutation instruction rotates a first one of said data elements by one or more positions in said matrix.

8. The method of claim 1 wherein said programmable processor is a microprocessor, digital signal processor, media processor, multimedia processor, cryptographic processor or programmable System-On-Chip (SOC).

9. The method of claim 1 wherein said permutation instruction alternately selects a first subword from a first column of said matrix and a second subword from said first column of said matrix and swaps the selected said first subword and the selected said second subword.

10. The method of claim 1 wherein said permutation instruction swaps a first subword in a first row of said matrix with a second subword in said first row of said matrix.

11. The method of claim 1 wherein said permutation instruction alternately selects a first subword from a first column of said matrix and a second subword from said first column of said matrix, swaps the selected said first subword and the selected said second subword and swaps the swapped first subword in a first row of said matrix with a third subword in said first row of said matrix or the swapped second subword in a second row of said matrix with a fourth subword in said second row of said matrix.

12. The method of claim 1 wherein said permutation instruction conditionally selects a first subword from a first column of said matrix and a second subword from said first column of said matrix dependant on a permutation control bit and swaps the selected said first subword and the selected said second subword.

13. The method of claim 1 wherein said permutation instruction conditionally swaps a first subword in a first row of said matrix with a second subword in said first row of said matrix dependant on a permutation control bit.

14. The method of claim 1 wherein said permutation instruction conditionally selects a first subword from a first column of said matrix and a second subword from said first column of said matrix dependant on a permutation control bit, swaps the selected said first subword and the selected said second subword and conditionally swaps the swapped first subword in a first row of said matrix with a third subword in said first row of said matrix or the swapped second subword in a second row of said matrix with a fourth subword in said second row of said matrix dependant on a permutation control bit.

15. The method of claim 1 wherein said permutation instruction defines a size of said subword, defines a subset of subwords in said sequence of subwords,
swaps a first subword in said subset with a second subword in said subset and concatenates the swapped first subword and second subword.

16. The method of claim 1 wherein said permutation instruction conditionally concatenates one or more odd elements of a first said subword sequentially with one or more second odd elements of a second said subword.

17. The method of claim 16 wherein said odd elements of a first said subword and odd elements of a second said subword are 32-bit subwords, 16-bit subwords or 8-bit subwords and said first subword and said second subword are 64-bit subwords.

18. The method of claim 1 wherein said permutation instruction conditionally concatenates one or more first even elements of a first said subword sequentially with one or more second even elements of a second said subword.

19. The method of claim 18 wherein said even elements of said first said subword and said even elements of said second said subword are 32-bit subwords, 16-bit subwords or 8-bit subwords and said first subword and said second subword are 64-bit subwords.

20. The method of claim 1 wherein said permutation instructions for said atomic unit is defined for larger subword sizes at successively higher hierarchical levels.

21. A system for permuting two-dimensional (2-D) data in a programmable processor comprising:
at least one source register containing said two dimensional data;
means for decomposing said two dimensional data into at least one atomic element said at least one atomic element of said two dimensional data is a 2×2 matrix;
a destination register;
means for determining at least one permutation instruction for rearrangement of said data in said atomic element said two dimensional data is decomposed into data elements in said matrix, said data elements being rearranged by said at least one permutation instruction, each of said data elements representing a subword having one or more bits; and
means for placing said permutated subwords into said destination register.

22. The system of claim 21 further comprising a triangle in said matrix, said data elements in said triangle being rearranged by said at least one permutation instruction.

23. The system of claim 22 wherein said permutation instruction rotates a first one of said data elements by one or more positions in said triangle.

24. The system of claim of claim 21 wherein said permutation instruction swaps a first one of said data elements and a second one of said data elements, said first one of said data elements and said second one of said data elements being in the same column of said matrix.

25. The system of claim 21 wherein said permutation instruction swaps a first one of said data elements and a second one of said data elements, said first one of said data elements and said second one of said data elements being in the same row of said matrix.

26. The system of claim 21 wherein said permutation instruction swaps a first one of said data elements and a second one of said data elements, said first one of said data elements and said second one of said data elements being diagonal to one another in said matrix.

27. The system of claim 21 wherein said permutation instruction rotates a first one of said data elements by one or more positions is said matrix.

28. The system of claim 21 wherein said permutation instruction conditionally selects a first subword from a first column of said matrix and a second subword from said first column of said matrix dependant on a permutation control bit and swaps the selected said first subword and the selected said second subword.

29. The system of claim 21 wherein said permutation instruction conditionally swaps a first subword in a first row of said matrix with a second subword in said first row of said matrix dependant on a permutation control bit.

30. The system of claim 21 wherein said permutation instruction conditionally selects a first subword from a first column of said matrix and a second subword from said first column of said matrix dependant on a permutation control bit, swaps the selected said first subword and the selected said second subword and conditionally swaps the swapped first subword in a first row of said matrix with a third subword in said first row of said matrix or the swapped second subword in a second row of said matrix with a fourth subword in said second row of said matrix dependant on a permutation control bit.

31. The system of claim 21 wherein said permutation instruction defines a size of said subword, defines a subset of subwords in said sequence of subwords,
swaps a first subword in said subset with a second subword in said subset and concatenates the swapped first subword and second subword.

32. The system of claim 21 wherein said permutation instruction conditionally concatenates one or more odd elements of a first said subword sequentially with one or more second odd elements of a second said subword.

33. The system of claim 21 wherein said odd elements of said first said subword and said odd elements of said second said subword are 32-bit subwords, 16-bit subwords or 8-bit subwords and said first subword and said second subword are 64-bit subwords.

34. The system of claim 21 wherein said permutation instruction conditionally concatenates one or more first even elements of a first said subword sequentially with one or more second even elements of a second said subword.

35. The system of claim 21 wherein said even elements of said first said subword and said even elements of said second said subword are 32-bit subwords, 16-bit subwords or 8-bit subwords and said first subword and said second subword are 64-bit subwords.

36. The system of claim 21 wherein said programmable processor is a microprocessor, digital signal processor, media processor, multimedia processor, cryptographic processor or programmable System-On-Chip (SOC).

37. The system of claim 21 wherein said permutation instructions for said atomic unit is defined for larger subword sizes at successively higher hierarchical levels.

38. A method for performing subword permutations in a programmable processor comprising the steps of:
in response to a permutation instruction alternately selecting a first subword from a first sequence of subwords in a first register and a second subword from a second sequence of subwords in a second register: and
concatenating the selected said first subword and the selected said second subword into a third sequence of subwords in a third register wherein said permutation instruction comprises a parameter for determining the number of bits in said first subword and said second subword to be selected, a reference to a first source register which contains said first sequence of subwords, a reference to a second source register which contains said second sequence of subwords and optionally a reference to a destination register which contains said third sequence of subwords.

39. The method of claim 38 further comprising the step of repeating said alternately selecting step for each of said subwords in said first sequence of subwords and each of said subwords in said second sequence of subwords.

40. The method of claim 38 wherein each subword comprises one or more bits.

41. A method for performing subword permutation in a programmable processor comprising the steps of:
swapping a first subword in a first register with a second subword in a sequence of subwords in a second register and concatenating the swapped said first subword and said second subword into a second sequence of subwords in a third register wherein said permutation instruction comprises a parameter for determining the number of bits in said first subword and said second subword to be swapped, a reference to a source register which contains said sequence of subwords and optionally a reference to a destination register which contains said second sequence of subwords.

42. The method of claim 41 further comprising the step of repeating said swapping step for each of said subwords in said sequence of subwords.

43. The method of claim 41 wherein each subword comprises one or more bits.

44. A method for performing subword permutation in a programmable processor comprising the steps of:
in response to a permutation instruction alternately selecting a first subword from a first sequence of subwords in a first register and a second subword from a second sequence of subwords in a second register;
concatenating the selected said first subword and the selected said second subword into a third sequence of subwords in a third register;
swapping a third subword in said third sequence of subwords with a fourth subword in said second sequence or said third sequence of subwords; and
concatenating the swapped said third subword with the swapped said fourth subword into a fourth sequence of subwords.

45. The method of claim 44 further comprising the step of repeating said alternately selecting step for each of said subwords in said first sequence of subwords and repeating said swapping step for each of said subwords in said third sequence of subwords.

46. The method of claim 44 wherein said permutation instruction comprises a parameter for determining the number of bits to be selected and to be swapped, a reference to a first source register which contains said first sequence of subwords, a reference to a second source register which contains said second sequence of subwords and optionally a reference to a destination register which contains said third sequence of subwords or said fourth sequence of subwords.

47. The method of claim 44 wherein each subword comprises one or more bits.

48. A method for performing subword permutations in a programmable processor comprising the steps of:
in response to a permutation instruction conditionally alternately selecting a first subword from a first sequence of subwords and a second subword from a second sequence of subwords dependant on permutation control bits; and
concatenating the selected said first subword and the selected said second subword into a third sequence of subwords wherein said permutation instruction comprises a control bit configuration for determining said permutation control bits, a first source register which contains said first sequence of subwords, a reference to a second source register which contains said second sequence of subwords and optionally a reference to a destination register which contains said third sequence of subwords.

49. The method of claim 48 further comprising the step of repeating said conditionally selecting step for each of said subwords in said first sequence of subwords and each of said subwords in said second sequence of subwords.

50. The method of claim 48 wherein each subword comprises one or more bits.

51. A method for performing subword permutation in a programmable processor comprising the steps of:
conditionally swapping a first subword with a second subword in a sequence of subwords dependant on permutation control bits in a first register and concatenating the swapped said first subword and said second subword into a second sequence of subwords in a second register wherein said permutation instruction comprises a control bit configuration for determining said permutation control bits, a reference to a source register which contains said sequence of subwords and optionally a reference to a destination register which contains said second sequence of subwords.

52. The method of claim 51 further comprising the step of repeating said conditionally swapping step for each of said subwords in said sequence of subwords.

53. The method of claim 51 wherein each subword comprises one or more bits.

54. A method for performing subword permutation in a programmable processor comprising the steps of:
in response to a permutation instruction conditionally electing a first subword from a first sequence of subwords in a first register and a second subword from a second sequence of subwords in a second register dependant on permutation control bits;

concatenating the selected said first subword and the selected said second subword into a third sequence of subwords in a third register;

conditionally swapping a third subword in said third sequence of subwords with a fourth subword in said second sequence or said third sequence of subwords dependant on said permutation control bits; and concatenating the swapped said third subword with the swapped said fourth subword into a fourth sequence of subwords.

55. The method of claim 54 further comprising the step of repeating said conditionally selecting step for each of said subwords in said first sequence of subwords and repeating said conditionally swapping step for each of said subwords in said third sequence of subwords.

56. The method of claim 54 wherein said permutation instruction comprises a control bit configuration for determining said permutation control bits, a reference to a first source register which contains said first sequence of subwords, a reference to a second source register which contains said second sequence of subwords and optionally a reference to a destination register which contains said third sequence of subwords or said fourth sequence of subwords.

57. The method of claim 54 wherein each subword comprises one or more bits.

58. A method for performing subword permutation of a sequence of subwords in a programmable processor comprising the steps of:

defining a size of said subword;

defining a subset of subwords in said sequence of subwords;

swapping a first subword in said subset in a first register with a second subword in a sequence of subwords in a second register and concatenating the swapped first subword and second subword into a second sequence of subwords in a third register; and repeating said swapping step for consecutive subsets of subwords wherein said permutation instruction comprises a parameter for indicating said size of said subword, a parameter for indicating a number of elements in each said subset; a parameter for indicating permutation configuration bits, a source register which contains said first sequence of subwords and optionally a reference to a destination register which contains said second sequence of subwords.

59. The method of claim 58 wherein each subword comprises one or more bits.

60. A system for performing subword permutations in a programmable processor comprising:

in response to a permutation instruction, means for alternately selecting a first subword from a first sequence of subwords in a first register and a second subword from a second sequence of subwords in a second register; and means for concatenating the selected said first subword and the selected said second subword into a third sequence of subwords in a third register wherein said permutation instruction comprises a parameter for determining the number of bits in said first subword and said second subword to be selected, a reference to a first source register which contains said first sequence of subwords, a reference to a second source register which contains said second sequence of subwords and optionally a reference to a destination register which contains said third sequence of subwords.

61. The system of claim 60 further comprising means for repeating said means for alternately selecting a first subword for each of said subwords in said first sequence of subwords and each of said subwords in said second sequence of subwords.

62. A system for performing subword permutation in a programmable processor comprising:

means for swapping a first subword in a first register with a second subword in a sequence of subwords in a second register and concatenating the swapped said first subword and said second subword into a second sequence of subwords in a third register wherein said permutation instruction comprises a parameter for determining the number of bits in said first subword and said second subword to be swapped, a reference to a source register which contains said sequence of subwords and optionally a reference to a destination register which contains said second sequence of subwords.

63. The system of claim 62 further comprising means for repeating said means for swapping for each of said subwords in said sequence of subwords.

64. A system for performing subword permutation in a programmable processor comprising:

in response to a permutation instruction, means for alternately selecting a first subword from a first sequence of subwords in a first register and a second subword from a second sequence of subwords in a second register;

means for concatenating the selected said first subword and the selected said second subword into a third sequence of subwords in a third register;

means for swapping a third subword in said third sequence of subwords with a fourth subword in said second sequence or said third sequence of subwords; and means for combining the said third sequence of subwords with the swapped said fourth subword into a fourth sequence of subwords.

65. The system of claim 64 further comprising means for repeating said means for alternately selecting for each of said subwords in said first sequence of subwords and repeating said means for swapping for each of said subwords in said second or third sequence of subwords.

66. The system of claim 64 wherein said permutation instruction comprises a parameter for determining the number of bits to be selected and to be swapped, a reference to a first source register which contains said first sequence of subwords, a reference to a second source register which contains said second sequence of subwords and optionally a reference to a destination register which contains said third sequence of subwords or said fourth sequence of subwords.

67. A system for performing subword permutations in a programmable processor comprising the steps of:

in response to a permutation instruction means for conditionally selecting a first subword from a first sequence of subwords in a first register and a second subword from a second sequence of subwords in a second register dependant on permutation control bits; and means for concatenating the selected said first subword and the selected said second subword into a third sequence of subwords in a third register wherein said permutation instruction comprises a control bit configuration for determining said permutation control bits, a first source register which contains said first sequence of subwords, a reference to a second source register which contains said second sequence of subwords and optionally a reference to a destination register which contains said third sequence of subwords.

68. The system of claim 67 further comprising means for repeating said means for conditionally selecting for each of said subwords in said first sequence of subwords and each of said subwords in said second sequence of subwords.

69. A system for performing subword permutation in a programmable processor comprising:

in response to a permutation instruction, means for conditionally swapping a first subword in a first register with a second subword in a sequence of subwords in a second register dependant on permutation control bits and concatenating the swapped said first subword and said second subword into a second sequence of subwords in a third register wherein said permutation instruction comprises a control bit configuration for determining said permutation control bits, a reference to a source register which contains said sequence of subwords and optionally a reference to a destination register which contains said second sequence of subwords.

70. The system of claim 69 further comprising means for repeating said means for conditionally swapping for each of said subwords in said sequence of subwords.

71. A system for performing subword permutation in a programmable processor comprising:

in response to a permutation instruction, means for conditionally selecting a first subword from a first sequence of subwords in a first register and a second subword from a second sequence of subwords in a second register dependant on permutation control bits;

means for concatenating the selected said first subword and the selected said second subword into a third sequence of subwords;

means for conditionally swapping a third subword in said third sequence of subwords with a fourth subword in said second sequence or said third sequence of subwords dependant on said permutation control bits in a third register; and means for combining the third sequence of subwords with the swapped said fourth subword into a fourth sequence of subwords.

72. The system of claim 71 further comprising means for repeating said means for conditionally selecting each of said subwords in said first sequence of subwords and repeating said means for conditionally swapping for each of said subwords in said second or third sequence of subwords.

73. The system of claim 71 wherein said permutation instruction comprises a control bit configuration for determining said permutation control bits, a reference to a first source register which contains said first sequence of subwords, a reference to a second source register which contains said second sequence of subwords and optionally a reference to a destination register which contains said third sequence of subwords or said fourth sequence of subwords.

74. A system for performing subword permutation of a sequence of subwords in a programmable processor comprising:

means for defining a size of said subword;

means for defining a subset of subwords in said sequence of subwords;

means for swapping a first subword in said subset in a first register with a second subword in a sequence of subwords in a second register and concatenating the swapped first subword and second subword into a second sequence of subwords; and means for repeating said swapping step for consecutive subsets of subwords.

75. The system of claim 74 wherein said permutation instruction comprises a parameter for indicating said size of said subword, a parameter for indicating a number of elements in each said subset; a parameter for indicating permutation configuration bits, a source register which contains said first sequence of subwords and optionally a reference to a destination register which contains said second sequence of subwords.

\* \* \* \* \*